(12) United States Patent
Lock (10) Patent No.: US 6,362,455 B1
(45) Date of Patent: Mar. 26, 2002

(54) SPINNING MIRROR LASER SYSTEM WITH FOCUSED BEAM

(75) Inventor: William E. Lock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/520,675

(22) Filed: Mar. 7, 2000

(51) Int. Cl.[7] ............................................... B23K 26/06
(52) U.S. Cl. ................................................ 219/121.74
(58) Field of Search ..................... 219/121.6, 121.74, 219/121.78

(56) References Cited

U.S. PATENT DOCUMENTS

| | | | |
|---|---|---|---|
| 4,456,811 A | * | 6/1984 | Hella et al. ............... 219/121.6 |
| 4,844,574 A | * | 7/1989 | Chande ................... 219/121.6 |
| 5,096,511 A | * | 3/1992 | Fetting ................... 219/121.78 |

FOREIGN PATENT DOCUMENTS

| | | | | |
|---|---|---|---|---|
| JP | 60-236482 | * | 11/1985 | ............ 219/121.74 |
| JP | 4-127990 | * | 4/1992 | ............ 219/121.74 |

* cited by examiner

*Primary Examiner*—Geoffrey S. Evans
(74) *Attorney, Agent, or Firm*—Harness, Dickey & Pierce, P.L.C.

(57) ABSTRACT

A laser system for directing an output laser beam onto a work piece is provided. The laser system includes a main housing. A laser source is provided for generating an input laser beam. A cylindrical housing is supported for angular rotation within the main housing. The cylindrical housing includes an input aperture at a first end for receiving the input laser beam and a reflecting mirror at a second end for directing the input laser beam through an exit aperture. An annular mirror is supported within the main housing. The annular mirror receives the input laser beam directed through the exit aperture for generating the output laser beam. The output laser beam has an annular cross section.

16 Claims, 7 Drawing Sheets

SPINNING MIRROR LASER SYSTEM WITH FOCUSED BEAM

BACKGROUND OF THE INVENTION

1. Technical Field

The present invention relates generally to a laser system used for manufacturing fiber optic devices and fiber optic waveguides. More particularly, the present invention is directed to a laser system used for creating a variety of optical features within optical fibers and manufacturing specialty optical devices.

2. Discussion

The performance of communication systems is generally determined by the bandwidth or data rate of information that can be carried by the communication system. In order to achieve higher bandwidth, communication service providers are converting existing copper media transmission networks over to fiber optic media transmission networks, as well as installing additional high bandwidth optical fiber communication backbone networks. In order to communicate over these fiber optic networks and within the optical domain, a variety of specialty devices such as wavelength division multiplexors (WDM), optical switches, and optical add/drop devices (in addition to others) have been developed. Many of these specialty optical devices require a fiber optic waveguide having special features or require a substrate or packaging requiring special manufacturing techniques.

One technique for creating these features within a fiber optic waveguide is through the use of a heating device such as an open flame heating device. However, it can be difficult to precisely control the heating pattern with an open flame heating device, and difficult to control the amount of heat applied during manufacturing. Additionally, because various portions of the optical fiber or optical device have different sensitivities to heat during manufacturing, it often becomes necessary to localize the heat to a specific area of the device.

One technique for providing localized heat to the device is through the use of a laser. However, because the laser output beam is focused on a specific area, overheating or burning of the optical device may occur. One technique for overcoming this overheating problem is to provide a laser source which can be moved about the work piece or optical device. However, this often requires a substantial and expensive mechanical device for supporting and moving the laser source. Alternatively, symmetrical heating around a work piece or optical device has been achieved by rotating the device with respect to the fixed laser source. However, this technique also requires a specially designed mechanical device for precisely rotating the work piece or optical device. Accordingly, it is desirable to provide a laser source having a movable and/or steerable laser beam which can be precisely moved about the optical device or optical fiber in a localized area while avoiding overheating of the optical device. It is also desirable to provide a moveable laser beam which can be used for precision writing of optical features within an optical fiber or optical device.

SUMMARY OF THE INVENTION

In accordance with the teachings of the present invention, a laser system for directing an output laser beam onto a work piece is disclosed. The laser system includes a main housing. A laser source is provided for generating an input laser beam. A cylindrical housing is supported for angular rotation within the main housing. The cylindrical housing includes an input aperture at a first end for receiving the input laser beam and a reflecting mirror at a second end for directing the input laser beam through an exit aperture. An annular mirror is supported within the main housing. The annular mirror receives the input laser beam directed through the exit aperture for generating the output laser beam. The output laser beam has an annular cross section.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figures 1, 2:
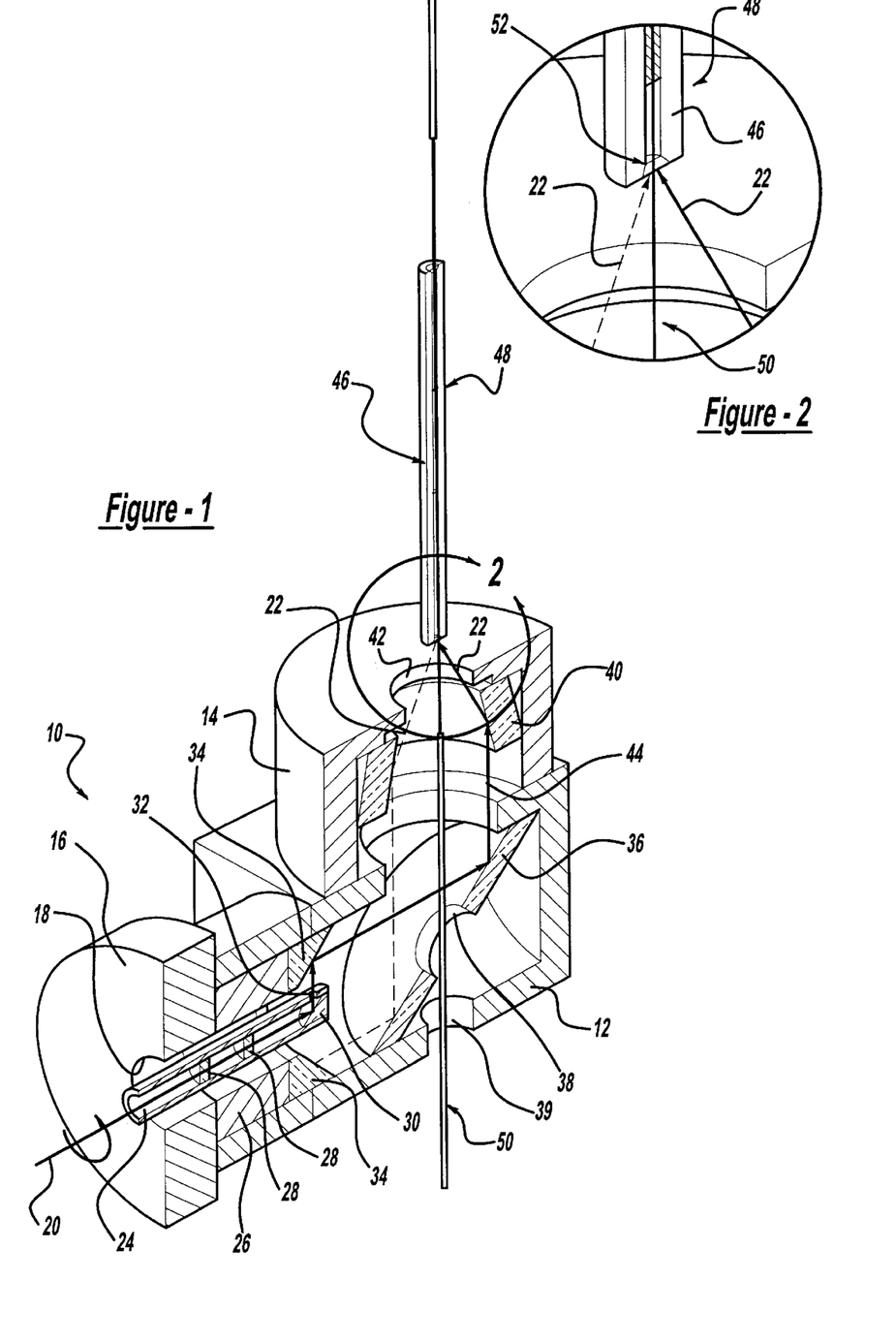
FIG. 1 is a perspective cross-sectional view of the spinning mirror laser tool in accordance with a preferred embodiment of the present invention.
FIG. 2 is an isolated view showing the focused laser beam for heating glass frit at the end portion of a glass substrate.

Turning now to FIG. 1, the laser tool 10 is shown in accordance with a preferred embodiment of the present invention. The laser tool 10 is generally defined by a main housing 12 and a side housing 14. A particular feature of laser tool 10 is that the axis of the output laser beam 22 is offset by 90 degrees from the axis of the input laser beam 20.

This feature allows the laser tool 10 to fit more efficiently within the manufacturing environment for an optical device or optical fiber drawing process. One end of the main housing 12 includes an end plate 16 having a centrally located aperture 18 formed therein.

A cylindrical housing 24 is supported within the main housing 12 by a bearing and drive assembly 26. As shown, a first end of the cylindrical housing 24 extends through aperture 18, and a second end of the cylindrical housing 24 extends into the main housing 12. The bearing and drive assembly 26 allows the cylindrical housing 24 to rotate within the main housing 12 about its longitudinal axis throughout a broad range of speeds.

The cylindrical housing 24 has an open central cavity within which beam shaping optical elements or lenses 28 are disposed. An input laser beam 20 is provided through an aperture formed at a first end of the cylindrical housing 24. The optical elements 28 function to further shape and/or focus the input laser beam 20 and project the input laser beam 20 against an angled mirror 30 disposed at a second end of the housing 24. The cylindrical housing 24 also includes an exit aperture 32 for allowing the laser beam to be projected against an angled annular mirror 34 secured within the main housing 12. As the cylindrical housing 24 rotates within the main housing 12, the input laser beam 20 is projected against the angled annular mirror 34 and is reflected toward an angled mirror 36 supported at preferably a 45° angle within the main housing 12.

As shown, the angled mirror 36 includes a central aperture 38 which allows an optical fiber or other optical element to be drawn through the laser tool 10. The main housing 12 also includes an aperture 39 aligned with the central aperture 38. The laser beam projected against angled mirror 36 is then reflected toward a focusing mirror 40 and through an exit aperture 42 formed within the side housing 14. As will be appreciated, the angular rotation of the cylindrical housing 24 in combination with the mirrors 30, 34 and 36 create a cylindrical laser beam 44 having an annular cross section. This annular laser beam 44 can then be directed and/or focused in a variety of ways by the focusing mirror 40. The focusing mirror 40 associated with laser tool 10 is designed for creating a conical output laser beam 22 which is focused against the glass substrate 46 of an optical device 48. However, as one skilled in the art will appreciate, the focusing mirror 40 can be modified for creating a variety of output laser beams 22.

FIG. 2 shows an isolated view of the substrate 46 of an optical device 48 and the output laser beam 22 which is being focused upon a portion of glass frit 52 at the end of the substrate 46. As part of the process for manufacturing the optical device 48, an optical fiber 50 is secured through a central cavity formed within the substrate 46. One technique for securing the optical fiber 50 is to heat a portion of glass frit 52 within the space between the optical fiber 50 and the end of the substrate 46. The laser tool 10 allows very precise and controlled heating of the glass frit 52 without overheating either the substrate 46 or the optical fiber 50. As the output laser beam 22 spins about the glass frit area 52, the laser beam can be modulated for precisely controlling the heating cycle. Additionally, the speed at which the cylindrical housing 24 and the laser beam are rotated can also be precisely controlled.

Figure 3:
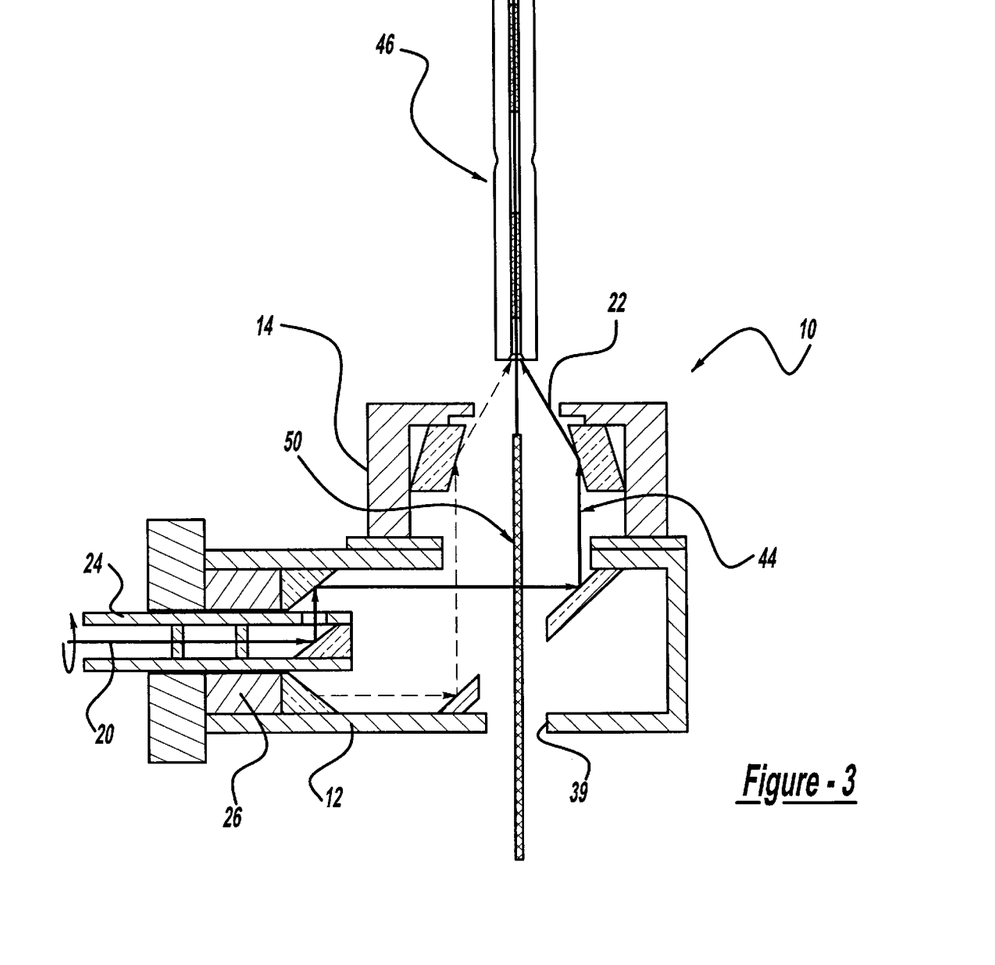
FIG. 3 is a cross-sectional view of the spinning mirror laser tool of FIG. 1.

FIG. 3 shows a side view in cross section of the laser tool 10 and more particularly illustrates the alignment of the optical path for creating the output laser beam 22. As will be appreciated, a variety of bearing assemblies 26 can be used for supporting the cylindrical housing 24 within the main housing 12. Additionally, while not specifically shown a variety of drive assemblies can also be used for rotating the cylindrical housing 24 for creating the annular laser beam 44. It is contemplated that the drive assembly may include a direct drive servo motor, a hydraulic drive mechanism, or a turbine drive system powered by compressed air.

Figure 4:
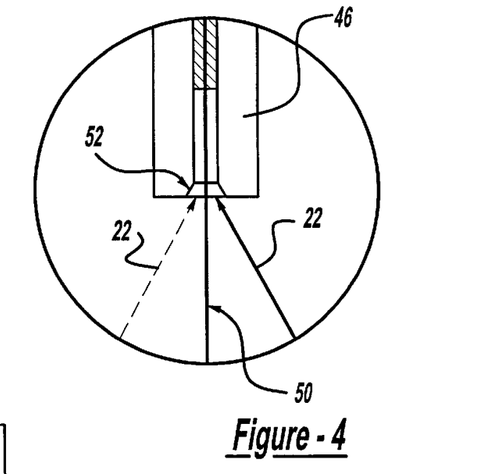
FIG. 4 is an isolated view of the focused laser for heating glass frit at the end portion of a glass substrate.

FIG. 4 is an isolated view showing the precision with which the output laser beam 22 can be focused against a work piece such as the glass frit area 52 of the substrate 46. The input laser beam 20 can be generated by a variety of laser sources including a $CO_2$ laser for heating applications, an excimer laser for writing optical features within the optical fiber or optical device, or a yttrium-aluminum-garnet (YAG) laser. While not specifically shown, the laser source can be mounted directly to the end plate 16, or alternatively can be provided from a remote laser source through a fiber optic bundle, or be directed by mirrors.

Figure 5:
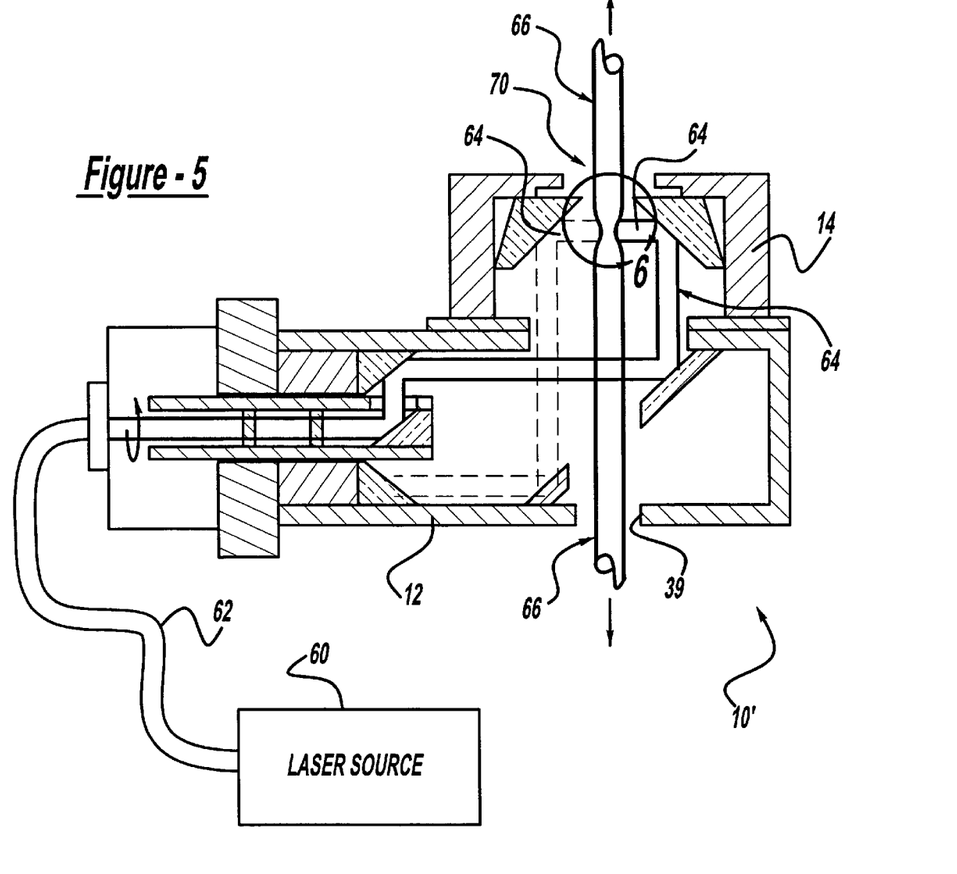
FIG. 5 is a cross-sectional view of the spinning mirror laser tool for directing a wide laser beam normal to a glass tube for forming a tapered region.
Figure 6:
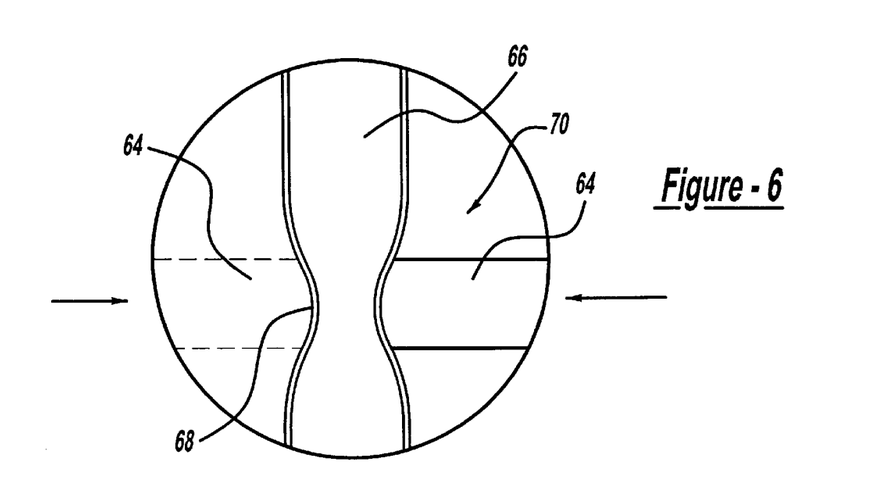
FIG. 6 is an isolated view of the wide laser beam used for heating the glass tube.

With reference to FIG. 5, the laser tool 10' is shown in accordance with another preferred embodiment of the present invention. Laser tool 10' is substantially similar to laser tool 10 of FIGS. 1 and 3. However, laser tool 10' is shown as being driven by a remote laser source 60, connected through a fiber optic bundle 62. A particular feature of laser tool 10' is that the output laser beam 64 is substantially normal to the work piece, such as a glass tube 66, as the glass tube 66 is drawn through and/or maintained through the housings 12, 14. The output beam 64 is also shown as being wider than the output beam 22 shown in FIG. 1. The wide output beam 64 is used for heating a larger surface area of the glass tube 66 with every pass of the beam. As the glass tube 66 is heated, the ends can be pulled apart for tapering a central portion 68 of the tube. Such a tapering technique is commonly used during the manufacturing of fiber couplers for interferometers and optical drop/add switches. FIG. 6 shows an isolated view of the wider heating zone 70 formed by the wider output laser beam 64.

Figure 7:
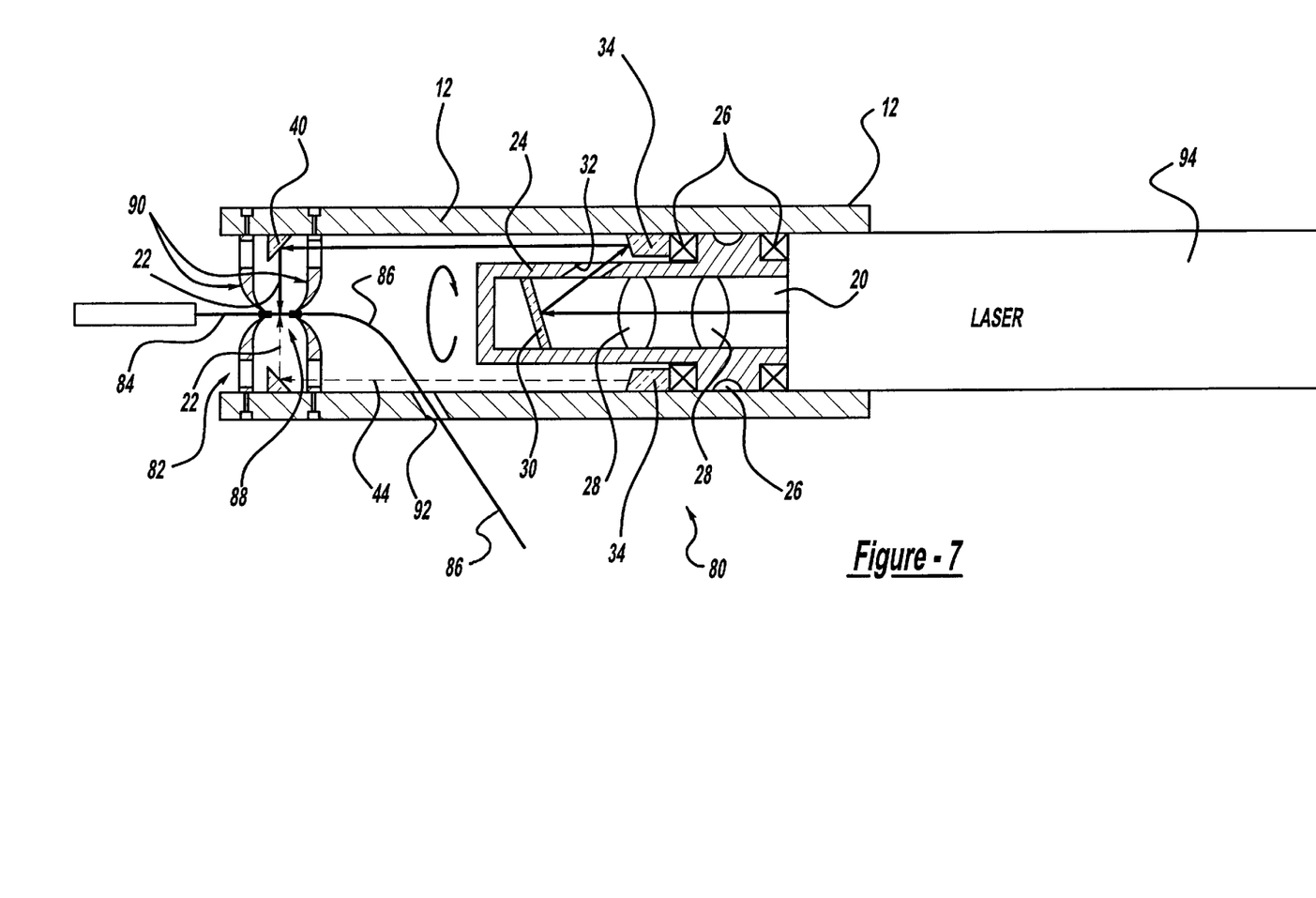
FIG. 7 is a cross-sectional view of the spinning mirror laser tool in the straight configuration according to an alternate preferred embodiment of the present invention.

Turning now to FIG. 7, a laser tool 80 is shown in accordance with an alternate preferred embodiment of the present invention. The laser tool 80 is generally defined by a main housing 12. One end of the main housing 12 includes a laser source 94 for projecting an input laser beam 20 into the cylindrical housing 24. As described above, the cylindrical housing 24 is supported within the main housing 12 by a bearing and drive assembly 26. The bearing and drive assembly 26 allows angular rotation of the cylindrical housing 24 about its longitudinal axis through a broad range of speeds.

The cylindrical housing 24 has an open central cavity within which beam shaping optical elements or lenses 28 are disposed. The optical elements 28 function to further shape and/or focus the input laser beam 20 and project the input laser beam 20 against an angled mirror 30 disposed at an end portion of the housing 24. The cylindrical housing 24 also includes an exit aperture 32 for allowing the laser beam to be projected against an annular angled mirror 34 secured within the main housing 12. As the cylindrical housing 24 rotates, the laser beam is projected against the angled conical mirror 34 and is reflected toward a focusing mirror 40, which in turn directs the output laser beam 22 toward the work piece, such as optical fibers 84, 86.

As will be appreciated, the angular rotation of the cylindrical housing 24 in combination with the mirrors 30, 34 creates a cylindrical laser beam 44 having an annular cross section. This annular laser beam 44 can then be directed and/or focused in a variety of ways by the focusing mirror 40. The focusing mirror 40 associated with laser tool 80 is designed for creating an output laser beam 22 which is focused in a direction normal to the optical fibers 84, 86 which are to be joined within a fiber splice zone 88.

The laser tool 80 is shown in a straight configuration and includes a fixture 82 for splicing two optical fibers 84, 86 within the fiber splice zone 88. As shown, the fixture 82 includes two annular fiber holders 90, one for precisely supporting each fiber 84, 86 within the fiber splice zone 88. In this alternate configuration, the output laser beam is formed normal to the optical fibers 84, 86 for precisely heating the ends of each fiber. However, by changing the type of focusing mirror 40, a conical, or other type of output laser beam 22 may be formed. The optical fiber 86 is fed into the fiber splice zone 88 through an aperture 92 formed within the main housing 12.

Figure 8:
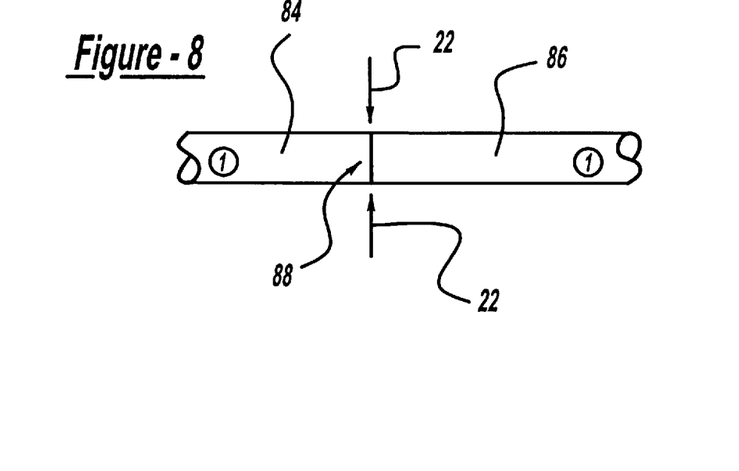
FIG. 8 is a diagram showing an exemplary use of the laser tool of the present invention for splicing two optical fibers having similar diameters.
Figure 9:
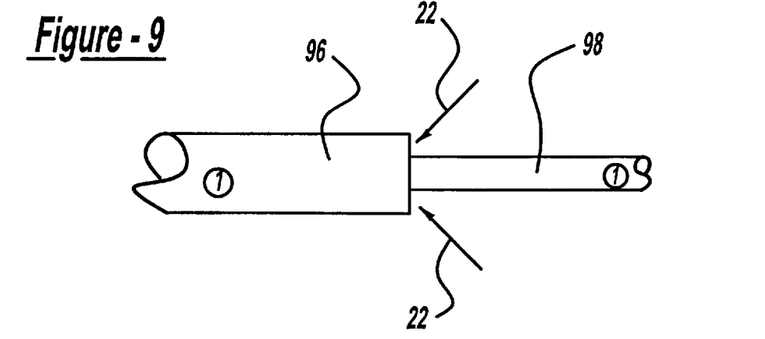
FIG. 9 is a diagram showing an exemplary use of the laser tool of the present invention for splicing two optical fibers having different diameters.
Figure 10:
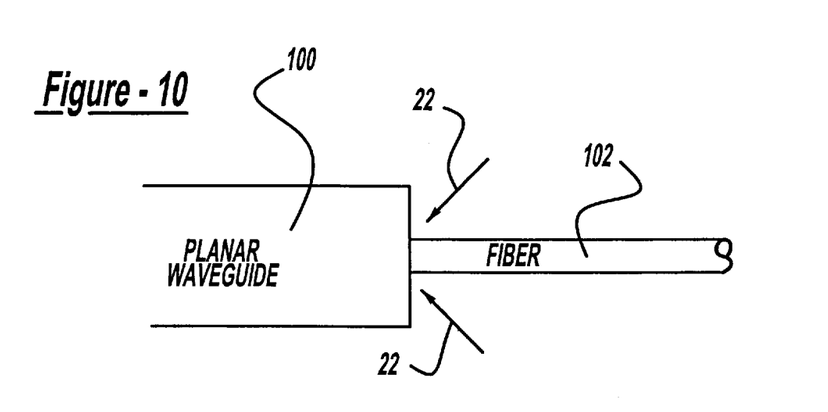
FIG. 10 is a diagram showing an exemplary use of the laser tool of the present invention for splicing an optical fiber with a planar waveguide.

The disclosed configurations for the laser tool of the present invention can be used for manufacturing a variety of optical fibers and optical devices. More specifically, FIG. 8 shows the output laser beam 22 being used for splicing two optical fibers 84, 86 having similar diameters within a fiber splice zone 88. This splicing technique may be accomplished with either laser tool 80 of FIG. 7, laser tool 10' of FIG. 5, or laser tool 10 of FIG. 1 using an alternate type of focusing mirror 40. FIG. 9 shows a splicing technique which is best accomplished by the laser tool 10 of FIG. 1, which produces a conical laser output beam 22 for splicing a larger diameter optical fiber 96 with a smaller diameter optical fiber 98. FIG. 10 also shows a splicing technique which is best accomplished by the laser tool 10 of FIG. 1, which produces a conical laser output beam 22 for splicing a planar waveguide 100 with an optical fiber 102. As will be appreciated, the annular shape of the output beam 22 allows heat energy to be precisely applied to the ends of each optical fiber or waveguide.

Figure 11A:
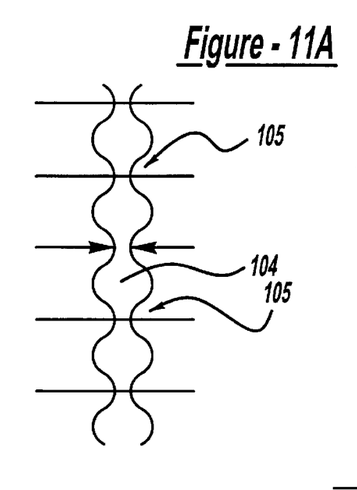
FIGS. 11A–11E are diagrams showing various optical features which can be formed within an optical fiber using the laser tool of the present invention.

The disclosed configurations for the laser tool of the present invention can be used for manufacturing a variety of optical features within optical fibers and optical devices. More specifically, FIGS. 11A–11E disclose some of the various optical features which can be created. The optical features are typically formed within optical fibers (before the coating process) in conjunction with the fiber-manufacturing draw. For example, FIG. 11A discloses an optical fiber 104 having a varying cross section. The optical fiber 104 is preferably created by heating annular rings 105 around the fiber 104 during the drawing process. The fiber 104 can be continuously guided through the laser tool 10', and the laser power can be pumped up, then down for creating the annular rings 105. Alternatively, the fiber 104 can be indexed through the laser tool 10' with short dwells to heat localized regions of the fiber 104. The fiber diameter would then decrease in the hot zones due to the tension placed on the fiber.

Figure 11B:
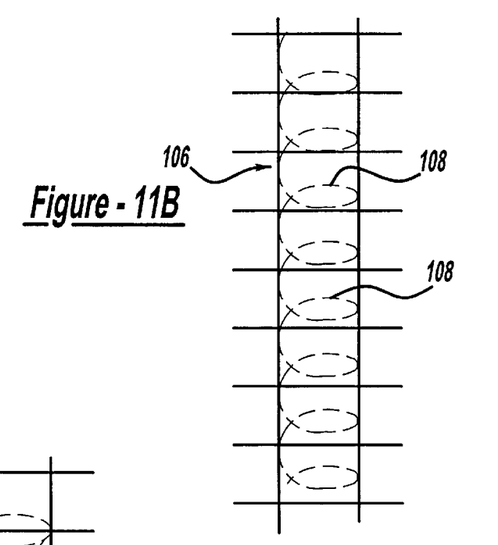

FIG. 11B discloses an optical fiber 106 having spiral reflection planes 108 formed along the length of the fiber. Preferably, the spiral reflection planes 108 of optical fiber 106 are produced using an excimer laser (UV) to write a pattern forming the desired optical feature into a specially prepared optical fiber blank. The spinning mirror of the laser tool 10' is rotated at a rate synchronized to the fiber pass-thru speed to create the desired spiral period for forming the spiral reflection planes 108. As will be appreciated, the width of the laser beam 22 can be adjusted for creating the particular optical feature.

Figure 11C:
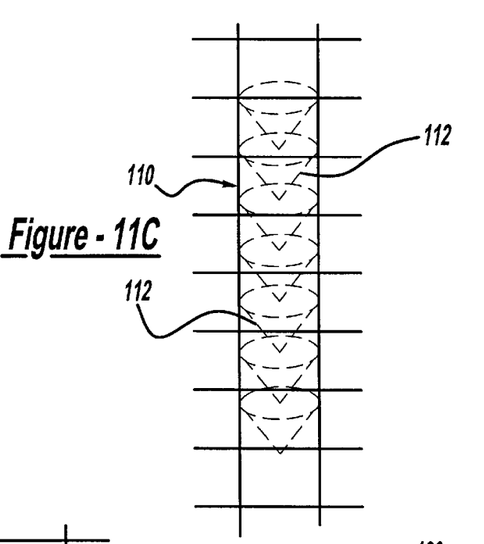
Figure 11D:
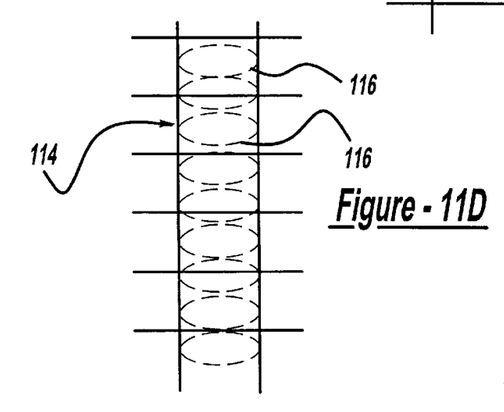
Figure 11E:
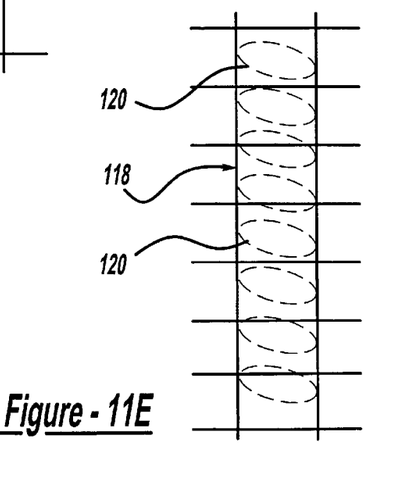

FIG. 11C discloses an optical fiber 110 having conical reflection planes 112 formed along the length of the fiber. Preferably, the conical reflection planes 112 are produced using the conical output laser beam of laser tool 10 (FIG. 1). A pre-doped optical fiber blank is exposed to the conical output beam 22 created by the spinning mirror laser tool 10 and indexing the optical fiber through the tool. FIG. 11D discloses an optical fiber 114 having flat reflection planes 116. The optical fiber 114 is preferably manufactured with laser tool 10' (FIG. 5) using a narrow output laser beam 22 transmitted in a radially converging focused beam pattern. FIG. 11E discloses an optical fiber 118 having flat inclined reflection planes 120. Optical fiber 118 is created in a similar fashion to optical fiber 114. However, the laser tool 10' is inclined relative to the fiber path.

Figure 12:
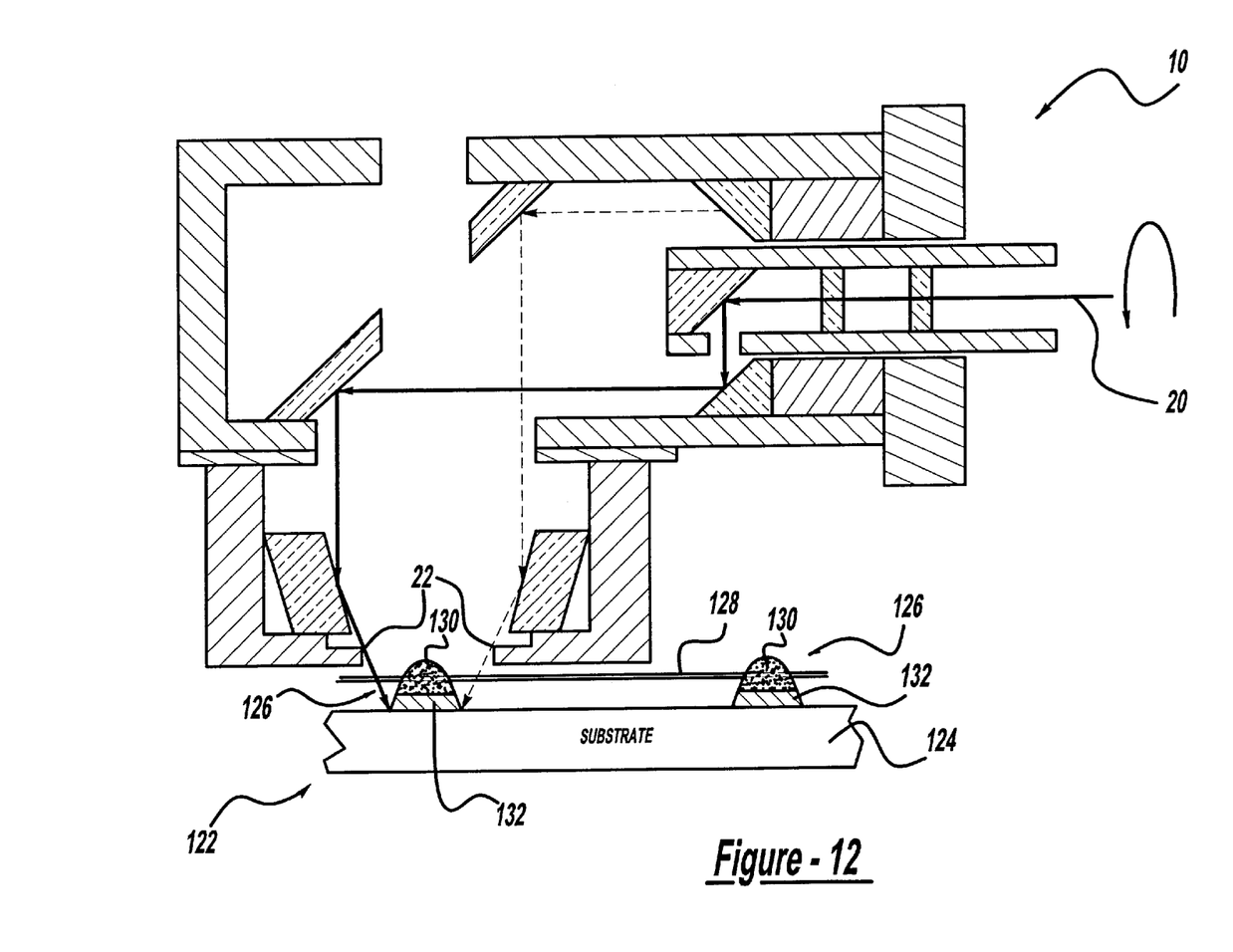
FIG. 12 is a diagram showing an exemplary use of the laser tool of the present invention for heating glass frit bumps on the substrate of an optical device.

FIG. 12 discloses another exemplary use for the laser tool 10 of FIG. 1. As shown, the laser output beam 22 is directed at the perimeter of a graded frit bump 126 formed on the top of a substrate 124 (preferably Beta-Eucryptite) of a fiber Bragg grating optical device 122. In order to accommodate the difference in thermal expansion coefficients, a graded frit bump 126 is used for securing the optical fiber or fibers 128 to the substrate 124. For example, the frit bump 126 is shown to include a first frit formulation 130 that will adhere securely to the fiber 128, and a second frit formulation 132 that will adhere securely to the surface of the substrate 124. The laser tool 10 is used to heat a localized zone around the frit bumps 126. Experimental results show that heating the frit bumps 126 from the top using the laser tool 10 results in the best frit to substrate interface attachment and minimizes overheating or warping the substrate 124.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A laser system for directing an output laser beam onto a work piece comprising:

a main housing;

a laser source for generating an input laser beam;

a cylindrical housing supported for angular rotation within the main housing, the cylindrical housing having an input aperture at a first end for receiving the input laser beam and a reflecting mirror at a second end for directing the input laser beam through an exit aperture;

an annular mirror supported within the main housing, the annular mirror receiving the input laser beam directed through the exit aperture for generating the output laser beam, the output laser beam having an annular cross section;

an angled mirror supported at an end of the main housing opposite the cylindrical housing for receiving the output laser beam generated by the annular mirror; and an annular focusing mirror disposed at an output end of the main housing, the annular focusing mirror receiving the output laser beam from the angled mirror and directing the output laser beam onto the work piece.

2. The laser system of claim 1 wherein the angled mirror is disposed at approximately a 45 degree angle with respect to a longitudinal axis of the main housing.

3. The laser system of claim 2 wherein the main housing includes a side housing disposed orthogonally to the main housing, the side housing containing the focusing mirror.

4. The laser system of claim 3 wherein the side housing includes an aperture formed therein for receiving at least a portion of the work piece.

5. The laser system of claim 1 wherein the cylindrical housing includes at least one optical element for shaping the input laser beam.

6. The laser system of claim 1 wherein angular motion is imparted to the cylindrical housing by a controllable drive mechanism for generating a cylindrical laser beam having an annular cross section within the main housing.

7. The laser system of claim 1 wherein the laser source is connected to an end plate associated with the main housing.

8. The laser system of claim 1 wherein the laser source is a remote laser source and the input laser beam is provided to the cylindrical housing through an optical waveguide.

9. A laser tool for directing an output laser beam onto a work piece comprising:

a main housing having a first end and a second end, the main housing having an end plate secured to the first end, the end plate having an aperture formed in a central portion thereof;

a side housing formed at the second end of the main housing, the side housing being disposed orthogonally to the main housing;

a laser source for generating an input laser beam;

a cylindrical housing supported for angular rotation within the main housing, the cylindrical housing having an input aperture at a first end for receiving the input laser beam and a reflecting mirror at a second end for directing the input laser beam through an exit aperture;

an annular mirror supported within the main housing, the annular mirror receiving the input laser beam directed through the exit aperture for generating the output laser beam, the output laser beam having an annular cross section;

an angled mirror supported at the second end of the main housing, the angled mirror receiving the output laser beam generated by the annular mirror; and an annular focusing mirror disposed within the side housing, the annular focusing mirror receiving the output laser beam from the angled mirror and directing the output laser beam onto the work piece.

10. The laser tool of claim 9 wherein the angled mirror includes an aperture formed therethrough for receiving the work piece.

11. The laser tool of claim 9 wherein the angled mirror is disposed at approximately a 45 degree angle with respect to a longitudinal axis of the main housing.

12. The laser tool of claim 9 wherein the side housing includes an aperture formed therein for receiving at least a portion of the work piece.

13. The laser tool of claim 9 wherein the cylindrical housing includes at least one optical element for shaping the input laser beam.

14. The laser tool of claim 9 wherein angular motion is imparted to the cylindrical housing by a controllable drive mechanism for generating a cylindrical laser beam having an annular cross section within the main housing.

15. The laser tool of claim 9 wherein the laser source is connected to the end plate.

16. The laser tool of claim 9 wherein the laser source is a remote laser source and the input laser beam is provided to the cylindrical housing through an optical waveguide.

* * * * *